United States Patent [19]

Meinert et al.

[11] 4,193,458
[45] Mar. 18, 1980

[54] TRACTOR AND IMPLEMENT AND HYDRAULIC SYSTEM THEREFOR

[75] Inventors: Harry M. Meinert, Des Moines; John D. Long, Ankeny, both of Iowa

[73] Assignee: Deere & Company, Moline, Ill.

[21] Appl. No.: 912,555

[22] Filed: Jun. 5, 1978

[51] Int. Cl.² .............................................. A01B 63/22
[52] U.S. Cl. ..................................... 172/328; 172/445; 172/448
[58] Field of Search ............... 172/7, 9, 328, 396, 172/439, 413, 445, 448, 449, 451, 458; 280/43.23, 405 B, 446 A, 456 A, 460 A, 461 A, 474, 475, 479 R, 479 A

[56] References Cited

U.S. PATENT DOCUMENTS

| | | |
|---|---|---|
| 3,073,622 | 1/1963 | Merritt ............................ 280/405 B |
| 3,207,233 | 9/1965 | Shumaker .................... 280/461 A X |
| 3,450,220 | 6/1969 | Frandsen et al. ............ 280/479 R X |
| 3,627,059 | 12/1971 | Jackson et al. .................... 172/413 |
| 3,630,290 | 12/1971 | Williams et al. ...................... 172/7 |

FOREIGN PATENT DOCUMENTS

1557749  4/1970  Fed. Rep. of Germany ........... 172/328

OTHER PUBLICATIONS

Operator's Manual #OM-A33814 Issue C7 for John Deere 7100 Mounted Max-Emerge Planters, May 1977, pp. 108, 109.
Parts Catalog #PC-1468 for John Deere 7100 Mounted Max-Emerge Planters, Oct. 1975, pp. 10, 11 and 17.

*Primary Examiner*—Richard T. Stouffer

[57] ABSTRACT

A hydraulic system is provided for an integrally-mounted agricultural implement which permits control of the tractor three-point hitch rockshaft cylinder, upper draft link hydraulic cylinder and lift assist hydraulic cylinder through a single valve control lever. One end of the double-acting lift assist cylinder is plumbed in parallel with the single-acting rockshaft cylinder and the other end of the lift assist cylinder is plumbed in parallel with the single-acting upper link cylinder. The fluid lines are coupled with a single control valve to permit the implement to be supported by the lift assist wheel and three-point hitch during transport, permit it to rock about the lower connection with the three-point hitch during transport and float vertically at the hitch connection during field operations while operating with the lift assist wheel elevated.

8 Claims, 3 Drawing Figures

TRACTOR AND IMPLEMENT AND HYDRAULIC SYSTEM THEREFOR

BACKGROUND OF THE INVENTION

The present invention relates generally to tractor and implement arrangements and more particularly to an improved hydraulic system for coordinating the action of a lift assist wheel on an integrally-mounted implement with the three-point hitch of the tractor.

A significant amount of attention has recently been directed towards improving the productivity and profitability of farming operations. As a result, tractors with increased capacities and implements having wider toolbars capable of supporting greater weights are now commonly available.

For agricultural operations which utilize tools such an cultivators or rotary hoes, it is common to integrally mount the implement toolbar to the three-point hitch of the tractor. During field operations, the weight of such an integrally-mounted implement is distributed through the tools to the ground and through the toolbar to the three-point hitch. However, when the tractor hitch and the integrally-mounted implement are elevated to permit transport of the implement, the weight is transferred totally to the rear of the tractor. Since tractors commonly available today are capable of pulling more than they can lift, integrally-mounted implements, if too wide and heavy will lighten the front of the tractor when they are lifted, possibly resulting in a complete loss of steering control.

It is well known to provide larger integral implements with hydraulically actuated lift assist wheels to reduce the weight transferred to the tractor during transport. See, for example, the Model 7100 Mounted John Deere Planter. In such arrangements, actuation of the rockshaft hydraulic cylinder utilized to elevate the lower draft links of the three-point hitch is coordinated with the actuation of the lift assist hydraulic cylinder to raise and support the implement for transport. Typically, such an arrangement provides for the lift assist cylinder to be supplied with hydraulic fluid through lines coupled with a remote hydraulic cylinder outlet on the tractor while the rockshaft cylinder is supplied with hydraulic fluid through a separate hydraulic circuit contained within the housing of the tractor. Since each cylinder is supplied through a separate hydraulic circuit, at least two cab-mounted control levers must be manipulated to operate the cylinders. Accordingly, the operator must coordinate the two levers and actuation of the cylinders when raising the three-point hitch and lift assist wheel to transport the implement. Occasionally, structural damage can occur to either the hitch or implement when the actuation of the cylinders is not coordinated and the three-point hitch is not elevated in near synchronization with the lift assist wheel.

A hydraulic circuit providing a single control lever to activate the tractor rockshaft cylinder and the implement lift assist cylinder has been provided when only single-acting lift assist cylinder capability is required. This ability is provided through special valving contained within a rockshaft piston cover available for John Deere Model 4030 and other similar tractors. The piston cover hydraulically connects the single-acting rockshaft cylinder in parallel with the lift assist cylinder. Accordingly, both cylinders are actuated when the rockshaft cylinder is pressurized and both cylinders are connected with the reservoir to permit them to be in a float configuration when the rockshaft hydraulic cylinder is not pressurized.

This hydraulic circuitry permits the operator to extend the lift assist cylinder and lower the wheel for transport. However, during field operations, the rockshaft cylinder must be connected with the reservoir to allow the three-point hitch and implement to float vertically in response to ground contour changes. During this time, the lift assist wheel, which cannot be elevated since the lift assist cylinder is single acting, will travel along the ground behind the implement and compact the soil. If cultivating operations utilizing tools such as rotary hoes are performed, the trailing lift assist wheel will compact the soil loosened by the tools. Accordingly, it would be desirable to be able to elevate the lift assist wheel during such field operations.

A double-acting hydraulic cylinder has been provided on integrally-mounted implements having trailing lift assist wheels, as for example, the John Deere Model 7100 Mounted Max-Emerge Planter. In this arrangement, the trailing lift assist wheel can be elevated during planting operations and lowered to assist during transport operations. However, the arrangement does not couple the lift assist cylinder with the rockshaft cylinder in a single hydraulic circuit utilizing a single control lever. Here also, the operator must synchronize two separate control levers to elevate the implement lift assist wheel and tractor three-point hitch for transport of the implement.

A further problem which arises during transport of integral implements having trailing lift assist wheels occurs due to the changing ground contours and the lateral separation between the lift assist wheel and the implement connection with the tractor. As the lift assist wheel passes over ground contours different from those contours beneath the rear wheels of the tractor, the hitch connection will be put under compression or tension. To avoid structural damage to the hitch and/or implement during transport, some provision must be made to the connection to permit the implement to rock fore-and-aft about a transverse horizontal axis to accommodate the changing ground contours.

The John Deere Model 7100 Mounted Max-Emerge Planter has provided a mast connection between the implement and a three-point hitch which permits the implement to rock fore-and-aft at its connection with the hitch. A single-acting hydraulic cylinder is coupled with the compression link of the three-point hitch and put into a float configuration during transport to enable the implement to rock. During field operations, the mast cylinder is pressurized to act as a rigid link and to enable the implement to float vertically over changing ground contours about the pivotal connection between the three-point hitch with the implement. While the 7100 Mounted Planter with its hydraulic mast has provided a double-acting lift assist cylinder coupled with the single-acting mast cylinder, it does not provide a hydraulic system that also enables the operator to activate the single-acting rockshaft cylinder in near synchronization with the activation of the lift assist cylinder to avoid structural damage to the hitch and implement and to also simplify the operation of the integrally-mounted implement utilizing lift assist wheels.

SUMMARY OF THE INVENTION

To overcome these problems, a hydraulic system is provided which hydraulically couples a lift assist cylinder, a rockshaft cylinder and a compression link cylinder for activation through a single control valve and lever. To elevate the lift assist wheel during field operations yet lower it for transport, a double-acting lift assist cylinder is provided.

To enable the implement to rock about a transverse horizontal axis during transport and yet remain rigid with the three-point hitch during field operations, a single-acting hydraulic cylinder is coupled with the compression link of the tractor three-point hitch. To allow the three-point hitch to float during field operations and the rockshaft cylinder to be unpressurized while the compression link cylinder is pressurized, the two cylinders are connected to separate sides of the fluid flow control valve.

To elevate the double-acting lift assist cylinder during field operations and assure that the compression link cylinder is pressurized, the two cylinders are connected in parallel. To activate the rockshaft cylinder in near synchronization with the lowering of the lift assist wheel, the other end of the lift assist cylinder is connected in parallel with the rockshaft cylinder. To provide a single lever control for the three hydraulic cylinders, the two fluid lines connecting the compression link cylinder in parallel with one end of the lift assist cylinder and the other end of the lift assist cylinder in parallel with the rockshaft cylinder are coupled with a single remote cylinder outlet on the tractor and the rockshaft control valve is inactivated through providing either a valve or circuit disconnecting it from the rockshaft cylinder and connecting the rockshaft cylinder in parallel with the lift assist cylinder.

DESCRIPTION OF THE PREFERRED EMBODIMENT

Figure 1:
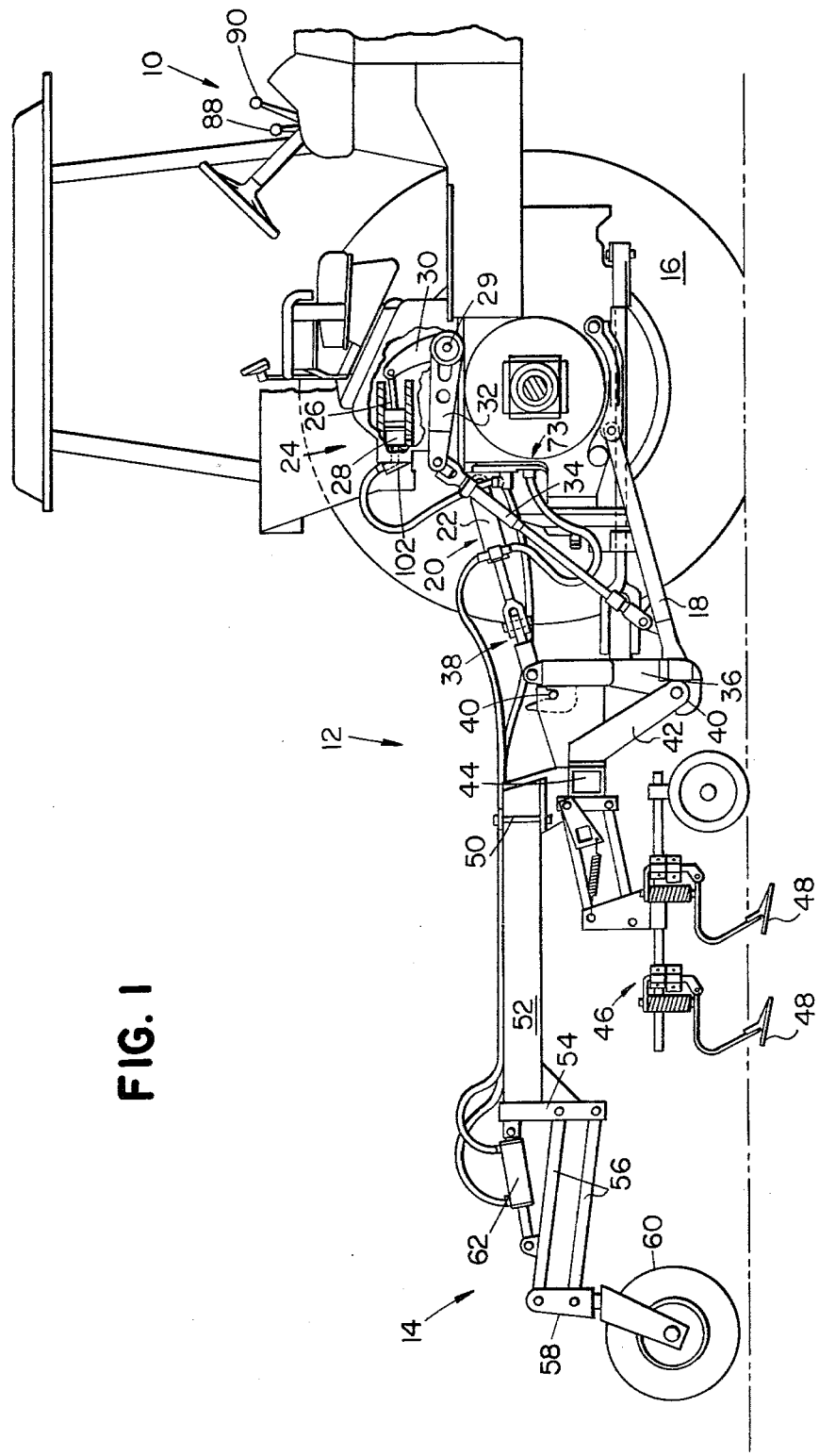
FIG. 1 is a side view of the tractor and implement with the rear wheel of the tractor and portions of the tractor housing structure removed to expose the three-point hitch and rockshaft hydraulic cylinder.

Looking now to FIG. 1, there is illustrated in side view a tractor 10 and an integrally-mounted implement 12 having a trailing lift assist wheel 14. The tractor 10 is of conventional construction and includes a main body carried on front steerable wheels (not shown) and rear tractor wheels 16. The rear portion of the tractor body is illustrated with one wheel removed and portions of the tractor housing broken away to reveal the various parts relevant to the invention.

The tractor 10 includes a three-point hitch comprised of a pair of trailing lower draft links 18 and an upper compression link 20. The conventional upper link would generally include a turnbuckle but in the preferred embodiment is replaced with a single-acting hydraulic cylinder 22. Each link 18, 20 of the hitch is pivotally coupled with the tractor 10 at its forward end and is of such a length so as to permit a toolbar coupled with the rear connections of the links 18, 20 to shift in an essentially vertical plane as the links 18, 20 rock about their forward pivotal connections with the tractor 10.

The tractor housing contains a single-acting rockshaft hydraulic cylinder 24 having a rod 26 extending beyond the cylinder housing 28 and coupled with a transversely extending rockshaft 29 through lever 30. The rockshaft 29 in turn carries at its opposite ends a pair of rearwardly extending lever arms 32 which are pivotally connected to respective draft links 18 by drop links 34. When the single-acting rockshaft cylinder 24 is pressurized and the rod 26 is extended, the draft links 18 are raised. As hydraulic fluid is released from the rockshaft hydraulic cylinder 24 and the rod 26 is free to move, the draft links 18 are free to drop or rise with the implement as it follows the ground contour.

At the rearward ends of the draft and compression links 18, 20 is carried an upstanding coupler element 36 for connecting implements 12 with the three-point hitch 38. The implement 12 includes a forwardly projecting mast structure 42 rigidly secured to the transversely extending toolbar 44. The coupler 36 includes lower and upper supports 40 upon which the forwardly projecting mast structure 42 of the implement 12 can be quickly and easily secured to integrally mount it with the tractor 10. The toolbar 44 further supports a plurality of rearwardly projecting earth-working tools 46. In the embodiment of FIG. 1, cultivator shovels 48 are illustrated although other earthworking tools can be and are commonly utilized with integrally-mounted implements.

Rigidly connected to the toolbar 44 by U-bolts 50 is a rearwardly extending lift assist frame 52. The frame 52 carries at its trailing end a vertical member 54 upon whch a pair of vertically spaced generally parallel rearwardly extending links 56 are pivotally connected. The links 56 are pivotally attached at their rearward ends to a wheel support 58 which rotatably carries a lift assist wheel 60. Mounted between the upper link 56 and the vertical member 54 is a double-acting hydraulic lift assist cylinder 62. While the preferred embodiment provides for the lift assist cylinder 62 to be positioned as illustrated, the invention could be practiced with the frame 52 being pivotally attached to the toolbar 44 and the cylinder 62 connected between the toolbar 44 and frame 52.

Figure 3:
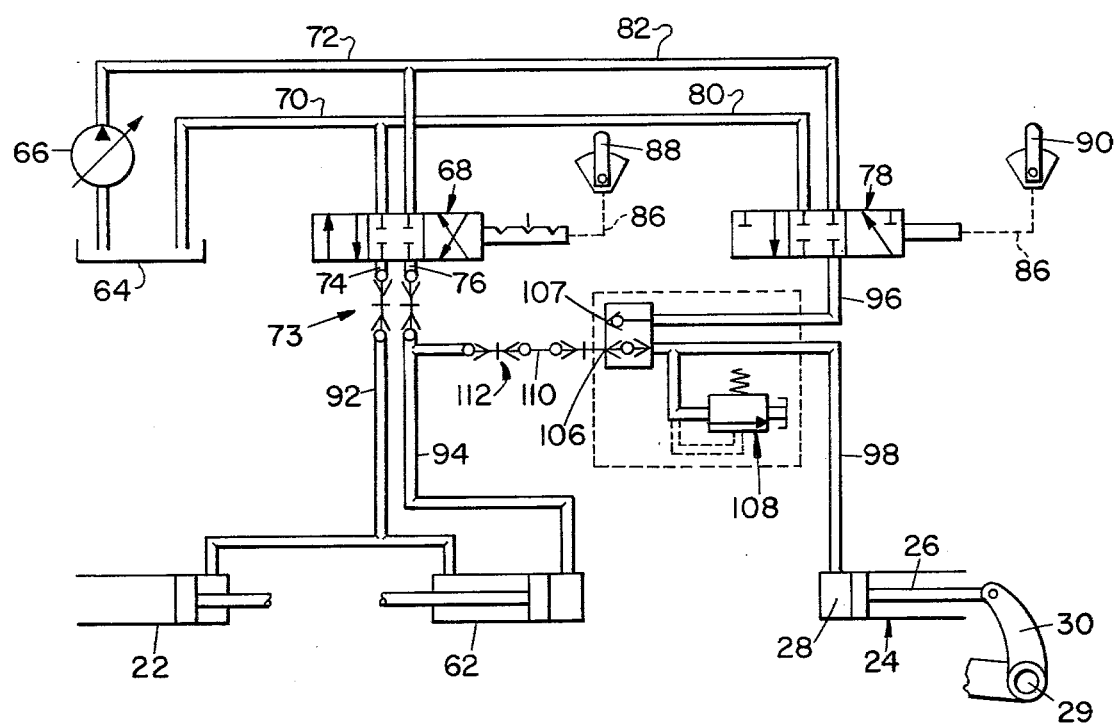
FIG. 3 is a schematic of the hydraulic system embodied in the tractor and implement arrangement illustrated in FIGS. 1 and 2.

The tractor 10 is provided with a conventional closed circuit hydraulic system having a source of hydraulic fluid pressure such as the reservoir 64 and a variable displacement pump 66 as schematically illustrated in FIG. 3. A remote outlet servo valve, indicated generally by the numeral 68, is carried within the tractor 10 and is connected to the reservoir 64 by the fluid line 70 and to the pump 66 by fluid line 72. Leading from the valve 68 to a remote hydraulic cylinder outlet 73 are fluid lines 74 and 76. A second servo valve 78 is conventionally provided in tractors for controlling the flow of fluid pressure to the rockshaft cylinder 24. Lines 80 and 82 respectively connect that valve 78 with the reservoir 64 and pump 66. The valves 68 and 78 would be actuated through any suitable linkage, illustrated by dotted lines 84 and 86, by manually shiftable control levers 88 and 90 mounted on the tractor 10 near the operator.

Fluid lines 92 and 94 are provided to couple the implement with the remote outlet 73 of the tractor 12. Each line 92 and 94, as well as the remote outlet 73, is provided with check valves to prevent fluid flow when disconnected. Line 92 connects in parallel the ram end of the single-acting link cylinder 22 with the ram end of the lift assist cylinder 62. Line 94 connects in parallel the base end of the lift assist cylinder 62 with the base end of the rockshaft cylinder 24.

To deactivate the rockshaft control valve 78, a piston cover 102 is provided between fluid line 96, leading from the valve 78 and line 98 leading to the rockshaft cylinder 24. The cover 102 connects the cylinder 24 with either the valve 78 or valve 68 and when utilized with the invention inactivates valve 78, thereby providing the control for all three cylinders 22, 62 and 24 through valve 68.

Figure 2:
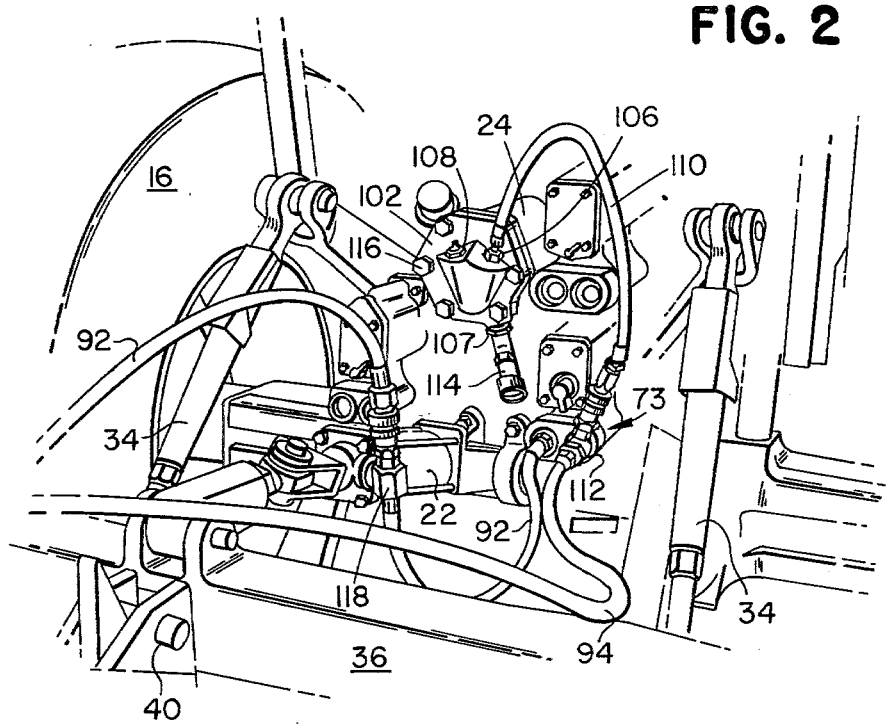
FIG. 2 is an enlarged rear perspective view of the tractor hitch area illustrating the hydraulic connections between the tractor and implement.

In the preferred embodiment, the piston cover 102 includes openings 106 and 107 and a pressure relief valve 108. As illustrated in FIG. 2, fluid line 110 is connected with fluid line 94 through the T-fitting 112 to couple the rockshaft hydraulic cylinder 24 in parallel with the base end of the lift assist cylinder 62. To disconnect the rockshaft cylinder 24 from fluid line 110 and reactivate the rockshaft valve 78, line 110 could be coupled with the outlet coupling 114 provided on the piston cover 102. Quick connect couplers are provided in line 110 and coupling 114 as well as the T-fitting 112.

In operation, the piston cover 102 and hydraulic link cylinder 22 would be installed prior to connecting the implement 12 to the three-point hitch 38. The piston cover 102 is installed by simply removing the bolts 116 attaching the conventional cover to the piston and replacing it with the preferred cover 102. The hydraulic link cylinder 22 would then be installed after the compression link turnbuckle was removed. As illustrated in FIG. 3, the cylinder 22 would be provided with the T-coupling 118 to permit it to be connected in parallel with the ram end of the lift assist cylinder 62.

The implement would then be connected with the three-point hitch coupler element 36 and the hydraulic lines 92 and 94 connected to the tractor remote outlet 73. The fluid line 94 connecting the lift assist cylinder 62 with the piston cover 102 would be connected to the T-fitting 112 to connect the rockshaft cylinder 24 in parallel with the base end of the lift assist cylinder 62 and the T-fitting on line 92 would be connected to the hydraulic link cylinder 22 to connect the hydraulic link cylinder 22 in parallel with the ram end of the lift assist cylinder 62.

To transport the integral implement 12, the operator would shift lever 88 to connect the pump 66 with lines 76 and 94 and the reservoir 64 with lines 74 and 92. The detent would maintain the valve 68 in that position until the operator again shifted it. As fluid flow pressurized line 98, the rockshaft rod 24 would extend lifting the links 18 and the ram of lift assist cylinder 62 would simultaneously extend lowering the wheel 60 into contact with the ground. As the drawbar links 18 would elevate the toolbar mast 42, the lift assist wheel 60 and frame 52 would elevate the toolbar 44. As the pump pressurized line 94, the fluid in line 92 would flow from the rod end of the lift assist cylinder 62 to the reservoir 64 and fluid from the ram end of the single-acting hydraulic link cylinder 22 would be able to return to the reservoir 64, permitting the rod of cylinder 22 to float. During transport, the rockshaft cylinder 24 would be extended to maintain the three-point hitch 38 elevated, the lift assist cylinder 62 would be extended to support the heavy integral implement 12 and the hydraulic link 22 would be able to float to permit the implement 12 to rock fore-and-aft about a horizontal axis through the pin connection between the mast 42 and coupler element 36.

Once in the field, the operator would again shift the lever 88 to reverse the flow of fluid pressure in lines 92 and 94. As the valve 68 was shifted and fluid flows from line 94 to the reservoir 64, the rockshaft cylinder ram 26 would retract and the drawbar links 18 would lower. Simultaneously, as fluid flow pressurized line 92, the ram end of the lift assist cylinder 62 would retract, elevating the list assist wheel 60 from the ground. The flow would also pressurize the hydraulic link cylinder 22 and cause the ram to retract and the cylinder 22 to act essentially as a rigid link. With the rockshaft cylinder 24 able to float, the three-point hitch 38 can shift vertically whenever the integral implement 12 encounters a change in ground contour requiring such movement relative to the tractor 10. With the lift assist cylinder ram retracted, the elevated lift assist wheel 60 will not compact the soil recently worked by the tools 46. The retracted hydraulic link cylinder 22 will act as an essentially rigid link permitting the three-point hitch 38 to shift in an essentially vertical plane and about the pivotal connections between the drawbar links 18 and compression link 30 or cylinder 22 with the tractor 10.

Thus the hydraulic system provided for the tractors utilizing integrally-mounted implements permits the operator to control the three cylinders 22, 62 and 24 through a single valve 68 and lever 88 and coordinate extension of the rockshaft cylinder 24 with extension of the lift assist cylinder 62 to elevate the implement 12 for transport without the possibility of incurring structural damage to the connections between the hitch 38 and implement 12.

We claim:

1. In an improved tractor and implement arrangement comprising: a tractor having a three-point hitch including a pair of pivotally-mounted trailing lower draft links and a pivotally-mounted upper link, means operatively connected to and for raising and lowering the lower draft links including a single-acting rockshaft hydraulic cylinder, a hydraulic fluid reservoir, a source of hydraulic fluid pressure connected with the reservoir, and a control valve coupled with the source and reservoir and having two outlets, said valve operative to direct the flow of hydraulic fluid through either outlet either from the source or to the reservoir; an implement including a toolbar carried by the three-point hitch, a trailing lift assist wheel, a lift assist frame rotatably supporting the wheel for vertical movement relative to the toolbar, and a double-acting lift assist hydraulic cylinder between the implement and wheel for vertically moving the wheel; a single-acting hydraulic cylinder operatively coupled with the upper link of the tractor; first fluid line means coupled with one outlet of the control valve and connecting the hydraulic link cylinder and one end of the lift assist hydraulic cylinder in parallel; and second fluid line means coupled with the other outlet of the control valve and connecting the other end of the lift assist hydraulic cylinder in parallel with the rockshaft hydraulic cylinder.

2. The invention defined in claim 1 wherein the frame is rigid with the toolbar, the wheel is carried by a frame supported structure for vertical movement relative to the frame and the lift assist hydraulic cylinder is mounted between the frame and the structure.

3. The invention defined in claim 1 wherein the hydraulic cylinder operatively coupled with the upper link, is pivotally connected to the implement for rocking movement of said cylinder about a generally horizontal axis.

4. The invention defined in claim 1 wherein the two outlets are first and second remote outlet couplings exteriorly carried by the tractor, and the second fluid line means includes a flexible hose interconnecting one coupling with the rockshaft hydraulic cylinder.

5. The invention defined in claim 1 wherein the second fluid line means includes a first flexible hydraulic hose connected with the lift assist cylinder and the other valve outlet, and a rockshaft piston cover having fluid flow means in communication with the rockshaft hydraulic cylinder and a second flexible hydraulic hose which interconnects the first flexible hose and the fluid flow means of the piston cover.

6. In an improved tractor and implement combination comprising: a tractor having a three-point hitch including a pair of pivotally-mounted trailing lower draft links and a pivotally-mounted upper link including a single-acting hydraulic link cylinder, means operatively connected to and for raising and lowering the lower draft links including a single-acting rock shaft hydraulic cylinder, a hydraulic fluid reservoir, a source of hydraulic fluid pressure connected with the reservoir, a remote hydraulic outlet with first and second fluid line connections, a first selective control valve connecting the outlet with the reservoir and source and movable between a first position in which the first and second fluid line connections of the outlet are coupled with the source and reservoir respectively and a second position in which the first and second fluid line connections are coupled with the reservoir and source, respectively, and a second selective control valve connecting the rockshaft hydraulic cylinder with the source and reservoir, said second valve shiftable to connect the rockshaft hydraulic cylinder with either the source or reservoir; an implement having a tool-carrying structure carried by the three-point hitch, a lift assist wheel, frame means carried by the structure and rotatably supporting the wheel for vertical movement relative to the structure, a double-acting lift assist hydraulic cylinder between the wheel and structure and operative to vertically adjust the wheel relative to the structure; first fluid line means coupled with the first outlet connection and connecting the hydraulic link cylinder in parallel with one end of the lift assist hydraulic cylinder; second fluid line means coupled with the second outlet connection and connecting the rockshaft hydraulic cylinder in parallel with the other end of the lift assist hydraulic cylinder; and fluid flow control means between the rockshaft hydraulic cylinder, second fluid line means and second control valve, effective to hydraulically couple the rockshaft hydraulic cylinder selectively with either the first or second selective control valve.

7. The invention defined in claim 6 wherein the fluid flow control means includes a rockshaft piston cover having first and second fluid flow means in communication respectively with the second control valve and rockshaft cylinder, and a flexible fluid line for selectively coupling the second fluid flow means with either the second control valve or the second fluid line means.

8. The invention defined in claim 6 where the second fluid line means is further provided with a pressure relief valve.

* * * * *